Patented Feb. 12, 1924.

1,483,217

UNITED STATES PATENT OFFICE.

WILLIAM H. ENGELS, OF RAHWAY, NEW JERSEY, ASSIGNOR TO MERCK & CO., OF NEW YORK, N. Y., A CORPORATION OF NEW YORK.

ANALGESIC COMPOUND AND PROCESS OF PRODUCING THE SAME.

No Drawing.    Application filed September 22, 1922.  Serial No. 589,932.

*To all whom it may concern:*

Be it known that I, WILLIAM H. ENGELS, a citizen of the Republic of Germany, and a resident of Rahway, in the county of Union and State of New Jersey, have invented certain new and useful Improvements in Analgesic Compounds and Processes of Producing the Same, of which the following is a specification.

In the treatment of influenza, neuralgia, rheumatic conditions, and the like, salicylic acid, sodium salicylate, acetyl salicylic acid and salicylo-salicylic acid have hitherto been employed. All of these compounds with the exception of sodium salicylate, are insoluble in water, with the result that their use is practically limited to administration in solid form. On the other hand, while sodium salicylate is soluble in water, its use is attended with the difficulty that it liberates salicylic acid in the stomach.

I have now found that I can produce water-soluble salts of salicylo-salicylic acid, and particularly those of the alkalies and alkaline earths, of a purity compatible with therapeutic use, and have thereby, at the same time, enlarged the field of theraupeutic products by producing remedies of wider application than those previously used. It is not possible, however, to produce these salts by the process which has been used for making analogous compounds; namely, by neutralizing the salicylo-salicylic acid in an aqueous or alcoholic solution. This is because of the fact that with alcohols this acid is liable to form esters, while in alkaline water it is liable to be decomposed into salicylic acid (New and Non-Official Remedies, 1917, p. 267).

To produce these salts I dissolve salicylo-salicylic acid in one of the inert organic solvents, such, for example, as acetone, ethyl acetate, benzol, chloroform, or the like, and subject the so-formed solution to the action of a neutralizing agent, and particularly an alkali or alkaline earth compound, at an elevated temperature i. e. a temperature above room temperature, and preferably near the boiling point, and under anhydrous conditions. While I prefer to carry out my process at an elevated temperature, it will be understood that the same may be carried out at room temperature, but in that case the reaction takes place more slowly. After the reaction is completed, the excess of the neutralizing reagent is filtered off. The so-formed soluble salts are removed from the solution either by cooling and crystallizing, or by evaporating part of the solvent and precipitating with another solvent; for instance, benzol or ether.

To illustrate my invention I will now give a few examples in detail:

Example #1: 25.8 parts of salicylo-salicylic acid are dissolved in 100 parts acetone. At refluxing temperature the solution is treated with 10 parts technical anhydrous sodium carbonate. The excess of the carbonate is filtered off, most of the solvent removed by distillation, preferably in vacuo, and the salt is precipitated by addition of 150 parts benzol. The salt is separated from the mother liquor in the customary way.

Example #2: 25.8 parts of salicylo-salicylic acid are mixed with 5.3 parts pure anhydrous sodium carbonate and 300 parts benzol at an elevated temperature. After complete conversion has occurred, the mixture is allowed to cool and the sodium salt of salicylo-salicylic acid is removed from the mother liquor in the customary way.

The sodium salt of salicylo-salicylic acid so produced is a white powder completely soluble in water with neutral reaction, from which solution the salicylo-salicylic acid may be recovered by acidifying.

While I have particularly described in the foregoing illustrations the use of a sodium salt for carrying out the reaction and the production of soluble sodium salicylo-salicylic acid, I am not limited thereto, as I contemplate the use of other compounds, and particularly those of the alkali metals and alkaline earth metals, for the production of other water-soluble salts of salicylo-salicylic acid.

In the claims, I mean by an alkali salt or base, either the alkali metal group or the alkaline earth metal group.

I claim:

1. As an analgesic, a therapeutically pure alkali salt of salicylo-salicylic acid.

2. As an analgesic, therapeutically pure sodium salicylo-salicylate.

3. The process of making a water-soluble salt of salicylo-salicylic acid, which consists in treating salicylo-salicylic acid dissolved in an inert organic solvent with an alkaline compound, and isolating the salt of salicylo-salicylic acid so formed.

4. The process of making a water-soluble salt of salicylo-salicyclic acid, which consists in treating salicylo-salicylic acid dissolved in an inert organic solvent with an alkaline compound at an elevated temperature, and isolating the salt of salicylo-salicylic acid so formed.

5. The process of making a water-soluble salt of salicylo-salicylic acid, which consists in treating salicylo-salicylic acid dissolved in an inert organic solvent with an alkaline compound under anhydrous conditions, and isolating the salt of salicylo-salicylic acid so formed.

6. The process of making an alkali salt of salicylo-salicyclic acid, which consists in dissolving salicylo-salicylic acid in an inert organic solvent and treating the solution with an alkaline compound in excess, removing the excess of the alkali base or carbonate, and isolating the salt.

7. The process of making sodium salicylo-salicylate, which consists in dissolving salicylo-salicylic acid in an inert organic solvent and treating the solution with sodium carbonate under anhydrous conditions, and isolating the salt so formed.

8. The process of making sodium salicylo-salicylate, which consists in dissolving salicylo-salicylic acid in an inert organic solvent and treating the solution with sodium carbonate under anhydrous conditions and at an elevated temperature, and isolating the salt so formed.

9. The process of making sodium salicylo-salicylate, which consists in dissolving salicylo-salicylic acid in an inert organic solvent, subjecting the solution to the action of anhydrous sodium carbonate in excess and under anhydrous conditions, removing the excess of sodium carbonate when the reaction is completed, precipitating the sodium salicylo-salicylate so formed, and separating the same from the liquid.

10. The process of making sodium salicylo-salicylate, which consists in dissolving salicylo-salicylic acid in acetone, treating the solution with anhydrous sodium carbonate in excess, removing the excess of sodium carbonate when the reaction is completed, removing a part of the solvent, and precipitating the salt by adding benzol to the solution.

WILLIAM H. ENGELS.